(12) United States Patent
Joukov et al.

(10) Patent No.: US 8,677,339 B2
(45) Date of Patent: Mar. 18, 2014

(54) COMPONENT RELINKING IN MIGRATIONS

(75) Inventors: Nikolai A. Joukov, Thornwood, NY (US); Matthew A. Markley, Hays, KS (US); Birgit Pfitzmann, Valhalla, NY (US); HariGovind V. Ramasamy, Tarrytown, NY (US)

(73) Assignee: International Business Machines Corporation, Armonk, NY (US)

( * ) Notice: Subject to any disclaimer, the term of this patent is extended or adjusted under 35 U.S.C. 154(b) by 923 days.

(21) Appl. No.: 12/759,356

(22) Filed: Apr. 13, 2010

(65) Prior Publication Data
US 2011/0252403 A1    Oct. 13, 2011

(51) Int. Cl.
*G06F 9/44* (2006.01)

(52) U.S. Cl.
USPC .......................... 717/162; 717/169; 717/171

(58) Field of Classification Search
None
See application file for complete search history.

(56) References Cited

U.S. PATENT DOCUMENTS

| | | | | |
|---|---|---|---|---|
| 5,182,806 A | * | 1/1993 | McKeeman et al. | 717/145 |
| 5,193,191 A | * | 3/1993 | McKeeman et al. | 717/162 |
| 5,265,254 A | * | 11/1993 | Blasciak et al. | 717/130 |
| 5,493,682 A | * | 2/1996 | Tyra et al. | 717/122 |
| 5,561,800 A | * | 10/1996 | Sabatella | 719/331 |
| 5,581,697 A | * | 12/1996 | Gramlich et al. | 714/35 |
| 5,613,120 A | * | 3/1997 | Palay et al. | 717/165 |
| 5,715,432 A | * | 2/1998 | Xu et al. | 715/764 |
| 5,909,575 A | * | 6/1999 | Perry | 713/100 |
| 5,923,880 A | * | 7/1999 | Rose et al. | 717/145 |
| 5,973,687 A | * | 10/1999 | Foley et al. | 715/866 |
| 6,256,773 B1 | * | 7/2001 | Bowman-Amuah | 717/121 |
| 6,272,674 B1 | * | 8/2001 | Holiday, Jr. | 717/174 |
| 6,405,364 B1 | * | 6/2002 | Bowman-Amuah | 717/101 |
| 6,618,162 B1 | * | 9/2003 | Wiklof et al. | 358/1.15 |
| 6,662,357 B1 | * | 12/2003 | Bowman-Amuah | 717/120 |
| 6,735,767 B1 | * | 5/2004 | Bleizeffer et al. | 717/174 |
| 6,889,376 B1 | * | 5/2005 | Barritz et al. | 717/175 |
| 6,941,453 B2 | * | 9/2005 | Rao | 713/2 |
| 6,961,931 B2 | * | 11/2005 | Fischer | 717/168 |
| 7,080,159 B2 | * | 7/2006 | Chu et al. | 709/246 |
| 7,150,015 B2 | * | 12/2006 | Pace et al. | 717/176 |
| 7,181,731 B2 | * | 2/2007 | Pace et al. | 717/136 |
| 7,533,372 B2 | * | 5/2009 | Rettig et al. | 717/136 |
| 7,793,281 B2 | * | 9/2010 | Goring et al. | 717/170 |
| 7,885,793 B2 | * | 2/2011 | Padmanabhan | 703/2 |
| 8,191,080 B2 | * | 5/2012 | Goring et al. | 719/316 |
| 2002/0129347 A1 | * | 9/2002 | Fischer | 717/168 |
| 2003/0033158 A1 | * | 2/2003 | Hill et al. | 705/1 |
| 2003/0051236 A1 | * | 3/2003 | Pace et al. | 717/177 |
| 2003/0110253 A1 | * | 6/2003 | Anuszczyk et al. | 709/224 |

(Continued)

OTHER PUBLICATIONS

Meehean et al., A service Migration Case Study: Migrating the Condor Schedd, published by University of Wisconisn-Madison, Mar. 11, 2005, pp. 1-15.*

(Continued)

*Primary Examiner* — Tuan Q. Dam
*Assistant Examiner* — Zheng Wei
(74) *Attorney, Agent, or Firm* — Scully, Scott, Murphy & Presser, P.C.; Louis J. Percello, Esq.

(57) ABSTRACT

Component relinking in migrations may include discovering one or more dependencies in one or more components; planning one or more new locations where the one or more components are to be placed; determining relinking needs in the one or more components based on the discovering and the planning; and applying the relinking needs.

21 Claims, 6 Drawing Sheets

(56) References Cited

U.S. PATENT DOCUMENTS

| | | | |
|---|---|---|---|
| 2004/0117785 A1* | 6/2004 | Kincaid | 717/170 |
| 2005/0193382 A1* | 9/2005 | Goring et al. | 717/162 |
| 2006/0005162 A1* | 1/2006 | Tseng et al. | 717/107 |
| 2008/0195441 A1* | 8/2008 | Hacigumus | 705/7 |
| 2010/0037211 A1* | 2/2010 | Zakonov et al. | 717/130 |
| 2010/0106538 A1* | 4/2010 | Routray et al. | 705/7 |
| 2010/0313193 A1* | 12/2010 | Goring et al. | 717/170 |
| 2010/0319060 A1* | 12/2010 | Aiken et al. | 726/7 |
| 2011/0016447 A1* | 1/2011 | Goel et al. | 717/101 |
| 2011/0107327 A1* | 5/2011 | Barkie et al. | 717/176 |
| 2011/0209131 A1* | 8/2011 | Hohenstein et al. | 717/168 |

OTHER PUBLICATIONS

Salzmann et al., Dynamics and Mobility in Software Architecture, published by Institute for Informatics, Munich University of Technology, Aug. 10, 1999, pp. 1-10.*

Kostas Magoutis et al., Galapagos: Model-driven discovery of end-to-end application-storage relationships in distributed systems, IBM Journal of Research and Development vol. 52, No. 4/5, 2008, http://www.research.ibm.com/journal/abstracts/rd/524/magoutis.html.

Nikolai Joukov et al., Built-to-Order Service Engineering for Enterprise IT Discovery, 2008 IEEE International Conference on Services Computing (SCC 2008).

* cited by examiner

```xml
<Host id="d02ops004.xxx.yyy.com">
<Install class="DBMS" subclass="DB2" name="DB2 Enterprise Edition" version="7.2" vendor="yyy"
directory="/usr/lpp/db2_07_01" id="N-1">
    <Association refurl="fs://d02ops004.xxx.yyy.com/usr/lpp/db2_07_01" refid="N-320"/>
<Service protocol="db2" ports="3700" nports="uaweb" id="N-2">
    <GObject type="database" alias="UAWEBXX" name="UAWEB" id="N-3">
        <Association refurl="fs://d02ops004.xxx.yyy.com/HOME/UAWEB" refid="N-199"/>
    </GObject>
    <GObject type="database" alias="JAC" name="JAC" id="N-4">
        <Association refurl="db2://jacunix.pok.yyy.com:50000/JAC" refid="P-2"/>
    </GObject>
    <GObject type="database" alias="UAWEB" name="UAWEB" id="N-5">
        <Association refurl="fs://d02ops004.xxx.yyy.com/HOME/UAWEB" refid="N-199"/>
    </GObject>
</Service>
```

Fig. 4

| Direction Discovery_type | This_mwid_gal | This_host_name | Other_mwid_gal | Other_host_name |
|---|---|---|---|---|
| Out CONFIG | N1 | d02ops004.xxx.yyy.com | N320 | d02ops004.xxx.yyy.com |
| Out CONFIG | N3 | d02ops004.xxx.yyy.com | N199 | d02ops004.xxx.yyy.com |
| Out CONFIG | N4 | d02ops004.xxx.yyy.com | P2 | jacunix.pok.yyy.com |
| Out CONFIG | N5 | d02ops004.xxx.yyy.com | N199 | d02ops004.xxx.yyy.com |

Fig. 5

COMPONENT RELINKING IN MIGRATIONS

FIELD

The present application generally relates to computer systems, and computer system service technologies and information technology (IT) transformation tasks.

BACKGROUND

Migration, consolidation, virtualization, and cloudification are some of the information technology (IT) transformation tasks, particularly involved with the current era of cost savings and green data centers. In this disclosure, those and the like tasks are collectively referred to as "migration." A task in migration includes the discovery of dependencies or affinities, i.e., what components (servers, applications, application modules, databases, etc.) depend on what other components. Wave planning, i.e., grouping dependent components together so that they are migrated together and can be tested together in the target environment is another task.

There is yet another step in overall migrating that utilizes the knowledge of dependencies. In migrating to a target environment with different addresses (such as IP addresses or domain names in the context of the Domain Name Service), every configured dependency to a migrated component needs to be changed into the new address. This is referred to as "relinking" in the present disclosure. Relinking is currently done manually, often even without access to a detailed representation of the dependencies in the source environment.

Wrong relinking (typically overlooked dependencies) is a major source of errors that show up later in end-to-end testing and are difficult to identify and fix, thus contributing to long migration schedules and high migration costs. For those reasons, many enterprises continue to shy away from migrations.

Dependency configurations can occur in many places; hence the manual task is indeed large and risky. For instance, in WebSphere™ a dependency can be configured for an application server, an application, or a module such as an ear or jar file, or even (via aliasing) across several of these layers. It may also be configured directly in the Java™ code residing inside the modules.

BRIEF SUMMARY

A method and system for component relinking in migrations are provided. In one aspect, the method may include discovering one or more dependencies in one or more components and planning one or more new locations where the one or more components are to be placed. The method may further include determining relinking needs in the one or more components based on the discovering and the planning, and applying the relinking needs.

A system for component relinking in migrations, in one aspect, may include a discovery module operable to discover one or more dependencies in one or more components. The system may also include a planning module operable to plan one or more new locations where the one or more components are to be placed. The system may further include a relink module operable to determine relinking needs in the one or more components based on output of the discovery module and the planning module. The relink module may be also operable to apply the relinking needs.

A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

BRIEF DESCRIPTION OF THE SEVERAL VIEWS OF THE DRAWINGS

FIG. 4 illustrates examples of discovered dependencies in XML form.

FIG. 5 illustrates the same dependencies shown in FIG. 4 in database or spreadsheet form.

DETAILED DESCRIPTION

A method to automatically relink components during and/or after migration is disclosed. In one aspect, the method may include automatically discovering dependency information for all components involved in a migration or potentially dependent on components involved in the migration. The method may also include using a source-to-target placement plan for a specific wave (group of components to be moved together) and making automated configuration changes for dependencies that need relinking according to the combination of source dependency information and the source-to-target placement plan. It may be useful and beneficial to offer fast and low-risk migration tools, not only for the migration itself but also because many enterprises otherwise shy away from migration even if the end result, in its steady state, would be much cheaper or greener.

The relinked components may include components outside the current wave, e.g., those components not being migrated with the current group of components being migrated. The method may be augmented by flagging or identifying dependencies that are known, but currently not accessible to automated relinking, for resolution by other tools or by humans. The non-accessibility may stem from the servers being outside the current wave, or the dependency being only found by logs for custom code or middleware components where no detailed static dependency analysis is yet available, or others.

The disclosed system and method may automatically propose or even silently set the correct new dependency, rather than leaving that to a user to find out and do. Furthermore, dependencies may be handled directly in code, which would not show up in a server migration assistance tool with manual parameter selection, for example, because such a tool only shows explicit parameters, not the entire code or anything deep inside the code. The disclosed system and method may avoid a scenario in which a human user would overlook a dependency that needs changing among many other parameters most of which do not need to change. Servers outside the current wave that need relinking also may be covered, e.g., those servers not involved in current migration of components.

Figure 1B:
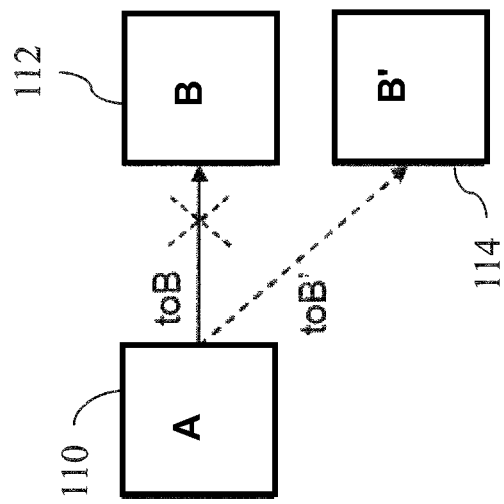
FIGS. 1A and 1B illustrate relinking concept in one embodiment.
Figure 1A:
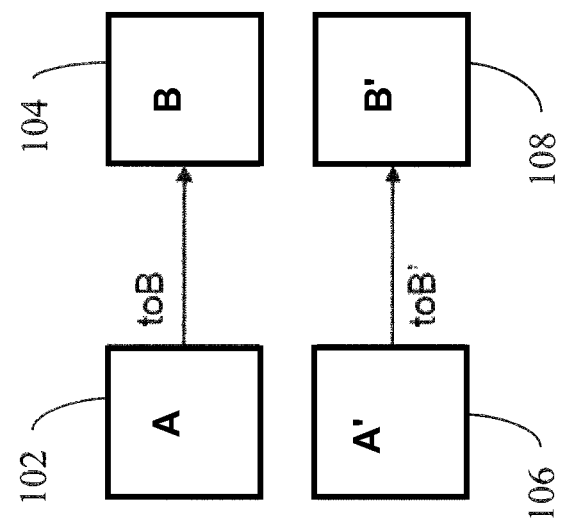

FIGS. 1A and 1B illustrate relinking concept in one embodiment. Components A (102) and B (104) may exist in an IT system. For example, they may be servers, applications, application modules, databases, and/or others. Component A (102) has a dependency on component B (104), indicated by the arrow from A to B. "Dependency" in this text means that component A (102), under certain circumstances, addresses component B (104), and that A (102) itself in some way contains an address or the like of B (104) for this purpose. This is indicated by the text "toB" at the arrow shaft.

In FIG. 1A, both components, A (102) and B (104), are migrated and become components A' (106) and B' (108). The components, A' (106) and B' (108), include some change to original components A (102) and B (104), for instance, in address or name. Now, in order for the overall system containing A and B to work correctly again after A and B were migrated into A' and B', component A' should be reconfigured to address B' in the place(s) where it so far addressed B. This is indicated by "toB'" on the bottom arrow.

In FIG. 1B, only component B (112) is migrated and becomes component B' (114). Nevertheless, component A (110) should be changed to address component B' (114) rather than component B (112).

In terms of individual technology to be used on the individual component A and/or A', the scenarios shown in FIGS. 1A and 1B are quite similar, but in the context of an overall migration they are often not: Case in FIG. 1A is simpler because component A is handled anyway and may have other parameters changed also for the migration, while in the case shown in FIG. 1B, component A only needs to be touched because of the relinking.

Figure 2:
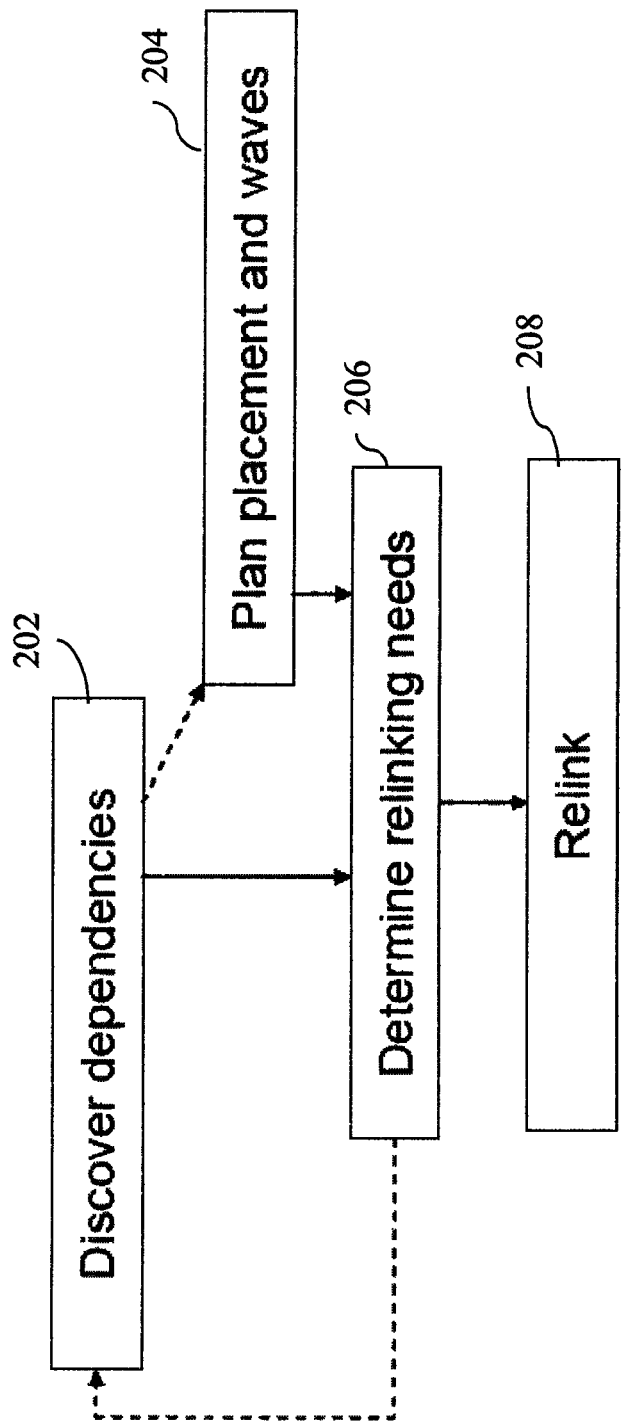
FIG. 2 is an architectural diagram illustrating functional components for a system that evaluates component removal in one embodiment of the present disclosure.

FIG. 2 is a flow diagram showing an overall method for relinking in one embodiment of the present disclosure. At 202, the dependencies are discovered. At 204, the future placement of the components, and thus their new addresses, are planned, as well as the groups in which they are to be moved. These groups are called waves. Migration may involve only one wave or a series of waves. Further, it should be noted that the system and method of the present disclosure is not limited to application to groups or waves. Rather, the system and method of the present disclosure is applicable to any one or more components and sub-components.

At 206, based on the results of the first two steps, the components and/or parameters for relinking are determined, for example, for each wave. For every component B (as in FIG. 1A and FIG. 1B) that is migrated in this wave and that will change its address (e.g., according to the placement plan), each dependency from a component A (inside or outside this wave) to B is identified for relinking. The result of this step is the new addresses for all these dependencies. At 208, the determined relinking may be applied.

Potentially, during step 206, the processing may return to step 202 because one may not do certain complicated cases of discovery unless there is a real need for them.

Dependencies may be configured or found in, for example, a configuration file, a configuration database, across multiple configuration files in an IBM™ WebSphere™ Application Server, an IBM™ DB2™ catalogue containing local names for remote databases, a local database clients containing these local names, and in computer codes. Those illustrate examples of the forms of configured dependencies.

Components may also have aliases, i.e., multiple names, and dependencies may address any of these aliases. Aliases can be defined in the component itself, in surrounding components on the same server, or in infrastructure components outside that same server. For example, the server where component B resides may be known as empdbsrv.company.com during the discovery and planning phase, and "empdbsrv" may be its main configured name (e.g., "uname" on UNIX-like systems). Nevertheless, it may also have a very different alias aix066.newyork.company.com, and it may have multiple IP addresses. Component A may be using any of these aliases and addresses to address component B.

Discovering dependencies at 202 in FIG. 2 may include discovery of the components. There are multiple ways of discovery. In one aspect, the discovery may be grouped into two classes: 1) static analysis of code and configuration files to find how connections to other components are made and how the addresses for these connections are derived; and 2) Run-time observation of actual interchanges between components, for example, by network observation or operating system instrumentation. In one aspect, log files of interchanges may be considered as falling into the same class because they store run-time observations of actual interchanges for later use.

For reuse in the relinking step at 208, dependencies are discovered according to the first class, i.e., by determining how they are configured. This may be done, for example, by the IBM™ Tivoli™ Application Dependency Discovery Manager product or by the IBM™ Galapagos tools, described in Kostas Magoutis, Murthy Devarakonda, Nikolai Joukov, and Norbert G. Vogl: "Galapagos: Model-driven discovery of end-to-end application-storage relationships in distributed systems"; IBM Journal of Research and Development Vol. 52, No 4/5, 2008, http://www.research.ibm.com/journal/abstracts/rd/524/magoutis.html and Nikolai Joukov, Murthy V Devarakonda, Kostas Magoutis, and Norbert Vogl: "Built-to-Order Service Engineering for Enterprise IT Discovery", 2008 IEEE International Conference on Services Computing (SCC 2008). The output of step 202 may be a normal discovery output that lists pairs of source and target components of dependencies, for example, in the form of a database, an XML file, a set of spreadsheets, a mathematical representation of a graph, etc. Dependencies also may be depicted graphically for human understanding. A machine-readable form of the discovered output may enable the automation of the following steps.

FIG. 4 illustrates examples of discovered dependencies, for example, in their XML form. FIG. 5 illustrates the same dependencies shown in FIG. 4 in database or spreadsheet form.

The description of the components N1, N3, etc. in this case may be in separate tables or spreadsheets. Discovery of aliases of the to-be-migrated components, both those defined in the components themselves and their surrounding components, and those defined in other servers and the network, for example, in DNS (Domain Name Service) configurations, may be done with discovery tools such as IBM™ Galapagos tools. For instance, assume the aliases of the server jacunix.pok.yyy.com in the XML result are: <LAN aliases="192.168.222.111 192.168.222.101 9.44.77.100 9.45.77.101 jacunix jacunix.pok.yyy.com ba11.pok.yyy.com"/>

In addition to the normal discovery output, the step "Discover Dependencies" at 202 may also already output where in the configuration or code it found these dependencies, but this may also be left to the relink step at 208 when the configuration and code files are actually changed. If such an output were added here, then, e.g., for dependencies discovered in files, it could contain a table where each row contains a dependency (as above), a filename including path, and a line number in that file.

Placement and wave planning at 204 may include deciding what components to move at all, and then where to move them, in particular by capacity considerations, and how to group them, for example, because one cannot move them all at the same time. Any method for placement and wave planning may be used. For example, tools such as VISIAN tool http://download3.vmware.com/vmworld/2006/tac4057.pdf) or CIRBA™ may be used for placement that automates the placement step. For wave planning the methodology disclosed in U.S. patent application Ser. No. 12/713,920 may be utilized. U.S. patent application Ser. No. 12/713,920 is incorporated herein by reference in its entirety. Typically wave planning may depend on discovered dependencies too.

The output of the placement and wave planning step at 204 may be a placement table (or list, or spreadsheet, or similar data structure) that determines source and target addresses for components, as well as a wave table (or similar data structure), which lists waves and what components are moved in each wave.

The following shows a mock-up example of a placement table, with three example servers mentioned above.

| Source | Target |
|---|---|
| empdbsrv.company.com | empdbsrv2.newplace.company.com |
| jacunix.pok.yyy.com | jaczlinux.pok.yyy.com |
| d02ops004.xxx.yyy.com | d02004zlinux.xxx.yyy.com |
| ... | ... |

Similarly, there may be a table for IP address changes. In some migrations, server names do not change and only IP addresses change; in that case only explicitly configured IP addresses may be relinked and not server names.

A wave table may look as follows, in this case all three example servers are migrated in different waves:

| Server | Wave |
|---|---|
| empdbsrv.company.com | 2 |
| jacunix.pok.yyy.com | 5 |
| d02ops004.xxx.yyy.com | 7 |
| ... | ... |

Determining relinking needs at 206 in FIG. 2 may include determining the relinking needs for a specific wave. For instance, when Wave 5 is moved, it includes the server jacunix.pok.yyy.com, which becomes jaczlinux.pok.yyy.com.

The components that have direct dependencies, and those listed in placement and wave tables, may be at a different granularity. For example, dependencies may be set inside application server modules, and have addresses of specific databases, while the entire application server or the entire database server, or even an operating system image is migrated as a whole. For instance, the components for which the dependencies are defined in the XML example shown in FIG. 4 are a database installation and three of its databases, and they are linked to file systems and other databases. In contrast, many placement tables, like the above example, are for entire servers. In the above representation, it can be found that component N-4, a database, has a dependency on another component, P-2, again a database, on the migrated server jacunix.pok.yyy.com. It can also be seen that component N-4 is on the server d02ops004.xxx.yyy.com which will only be migrated in wave 7, hence here is a case of relinking in a non-migrated component. The result of this step, for this one component N-4, is that it is known that it has to be relinked to a database that is still called JAC but now on the server jaczlinux.pok.yyy.com. It is thus helpful if the dependencies in the output of step 202 is in a form where it is easy to recognize larger surrounding components such as servers that may appear in a placement table, as it is the case in both the URL-style representation in the XML example of FIG. 4 and in the above database or spreadsheet example.

Relinking may contain an alias resolution substep. For instance, as it was discovered that the server jacunix.pok.yy.com may also be addressed as ba11.pok.yyy.com, components with Other_host_name=ba11.pok.yyy.com also may be searched for in the table representation, and also determined that they need to be relinked to jaczlinux.pok.yyy.com. It is conceivable that aliases are also mentioned in the main placement table or a different alias substitution table; in that case the new name from that table is taken. The discovered alias list identifies to which server this alias belongs and thus in which wave, here 5, it is moved.

A dependency can sometimes point to the same server, for example, in the above example the dependencies of databases on file systems. Such dependencies may be implemented with local addresses and not need relinking, but when in doubt it may be better to first determine a relinking need too, and validate in the relink step how the addressing is actually done.

In relinking at 208 in FIG. 2, the actual dependencies in configuration files, configuration databases, etc., as well as in the actual code may be changed. This may occur in a copy of the configuration files, databases, code, etc. that has already been made from the source system, because the source system typically keeps running while the target system is built up. The copies may already reside on the target servers, or be handled on intermediate computers specifically for migration.

The change can be made in different ways. For example, changes may be made directly in the data structures. For instance, the data structures may be directly manipulated that contain the addresses, for example, configuration files, configuration databases, or code. For example, a WebSphere™ Application server resource configuration file may be directly changed. In another example, a hardcoded dependency in code such as database connect statement may be directly changed. Yet in another example, a property in a properties file that holds the actual database name for the database connection made in the code may be changed.

Existing techniques that discover configured dependencies, e.g., in standardized configuration files, codes, or non-standard property files used by the codes may be utilized to find the places where something needs to be changed. For configuration files this may be done by done, for example, by the IBM™ Tivoli™ Application Dependency Discovery Manager product or by the IBM™ Galapagos tools described above. For codes and non-standard property files this may be done as described in U.S. patent application Ser. Nos. 12/511, 506 and 12/553,486, for example. For dependencies that are not represented in one place, but in several pieces, backtracking to all these pieces may be performed. For instance, if an application server A contains a local alias B* to a server B, and an individual module inside A addresses a database as db2://B*/D, then the alias B* should be set to B' when B migrates to B'.

In another aspect, instead of manipulating configuration files or the like directly, one may also interact with the components that are configured via these files or the like, using management interfaces of these components. This may occur on the target components. Many middleware components that are sold to multiple users have such management interfaces, e.g., JMX™.

Using such interfaces is particularly useful where discovery also used such interfaces, because then the discovery technology may be reused and, wherever it otherwise found a dependency, it now looks up the relinking need and rewrites the corresponding parameter. In this aspect, it is assumed that parameters that can be read can also be written, and that the relink program can be given the appropriate rights.

If dependencies are represented in several places, backtracking to outer components may be performed. The outer component may be treated with the same method of interaction via an interface (in particular if the outer and inner component share the management interface), or another method (e.g., direct change of a configuration file). In some cases, the outer component may be changed before the inner component.

Rather than completely being automated, it is possible to have a human use a graphical user interface and be supported in relinking by the results of the previous steps.

Yet in another aspect, if the target components are newly installed on a target servers, the installation process may take a buildsheet (or similar data structure) as input, which is a predetermined set of configuration parameters to be used in the installation. If the migration is prepared by setting up a buildsheet for the target component, then relinking may be done on this buildsheet. The buildsheet may look very much like either the actual configuration files or like a command sequence in a management interface; in these cases, the relinking is highly similar to one of the prior two cases. Otherwise, a mapping from discovered dependencies to corresponding buildsheet representation may be used. If dependencies are represented in several places, all appropriate places may be changed. If outer components are also treated by buildsheet change, dependencies of all inner components should be treated before the outermost component is actually installed.

As described above, the step of determining relinking needs at 206 may further return to the discovery step at 202 in some cases. This may be particularly useful if initially, some dependencies were only discovered via run-time observation. An example is if component B is initially in a migration plan while A is not, and run-time observation on B or its surrounding operating system or network shows a dependency of a component A on B, for example, as an incoming network connection. One might wait with extending the discovery to component A until one is otherwise sure whether it is possible and useful to migrate component B. Even if component A is also in the initial migration plan and thus discovery is performed on it, one may initially only find a dependency by run-time observation, and wait with more detailed analysis until the decision about migration of component B.

In cases like this, where a run-time observation of a dependency exists, the discovery of the static configuration of this dependency can use additional techniques that are not possible otherwise. In particular, one can specifically search for address elements that are likely to be part of the code or configuration parameters that determine the dependency. For instance, if the run-time observation showed a dependency from some custom application "cusapp" on server "appsrv.company.com" to database "EmpDB01" on server "empdbsrv.company.com", and either no initial discovery of static dependencies was done on server "appsrv.company.com" or it was not able to analyze the custom application "cusapp", then one may now search for strings "EmpDB01" and "empdbsrv" in "cusapp". This process may also contain an alias resolution substep, i.e., one may also search for other strings that may identify the database "EmpDB01" and the server "empdbsrv.company.com". Run-time interchanges, for example, addresses seen, can facilitate finding how specific dependencies are configured.

Note that this step may or may not involve additional contact with component A if some discovery was already performed there. Sometimes a more detailed analysis of already obtained data is sufficient, in particular with a technique that initially fetches many complete configuration files and analyzes them at the backend. Such techniques are provided in the IBM™ Galapagos tool described above and U.S. patent application Ser. Nos. 12/511,506 and 12/553,486.

Figure 3:
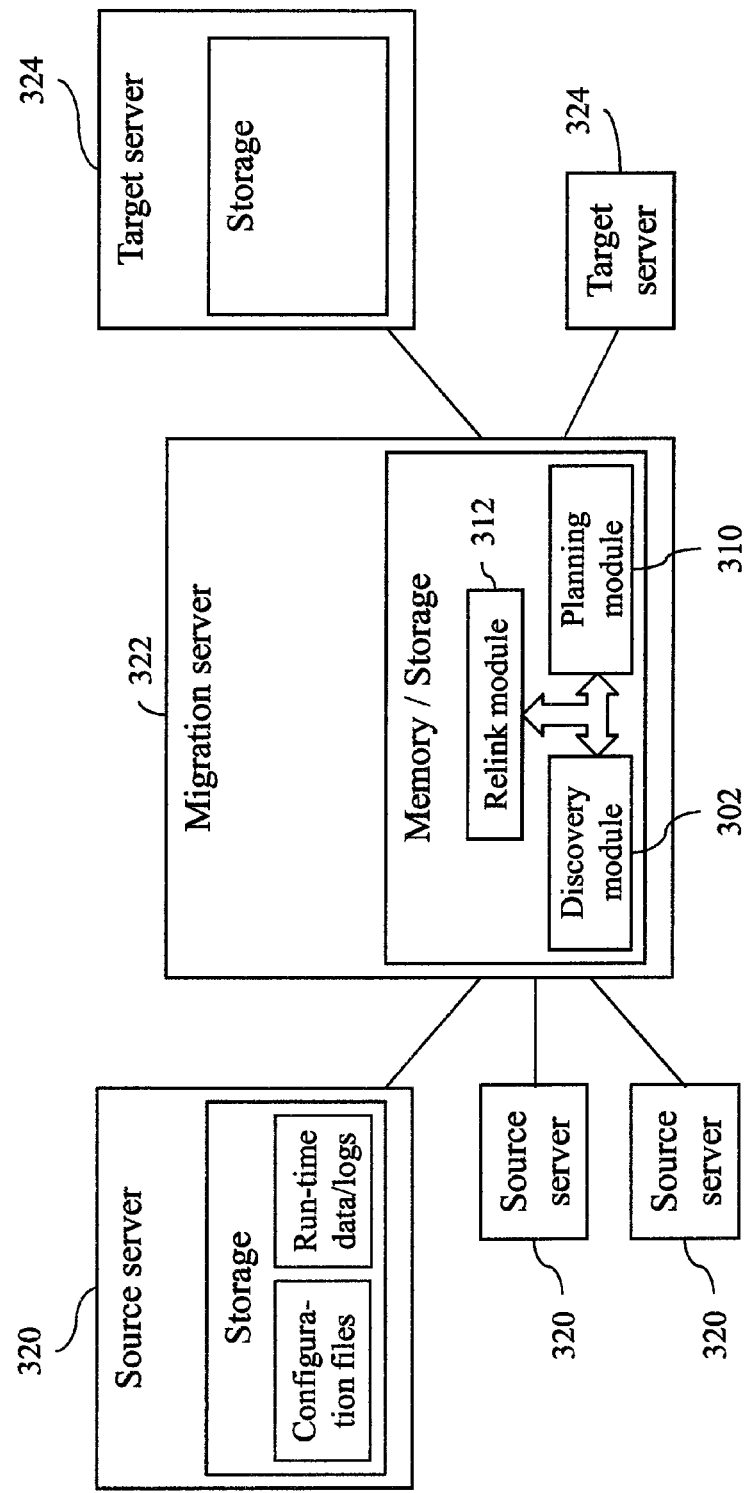
FIG. 3 is an architectural diagram illustrating functional components for a system that performs component relinking in migrations in one embodiment of the present disclosure.

FIG. 3 is an architectural diagram illustrating functional components for a system that performs component relinking in migrations in one embodiment of the present disclosure. The modules shown in FIG. 3 may be components of one or more computer systems that may include any computing node that is able to load and execute programmatic code, for instance, running the operating system and server application suite. A system logic may be embodied as computer executable code that is loaded from a remote source (e.g., from a network file system), local permanent optical (CD-ROM), magnetic storage (such as disk), or storage into memory for execution by one or more processors, e.g., CPUs. A network interface may be used for communicating to other network accessible services. Such an interface may include, but is not limited to a hardwired device, e.g., Ethernet over coax cable, wireless IP, and telephone to IP (VoIP), or others. The memory may include computer readable instructions, data structures, program modules and application interfaces providing logic or functional components for impact analysis of part removal from complex products.

It should be understood that while FIG. 3 illustrates the functional components residing in computer systems, the system and method of the present disclosure is not limited to only that configuration. Thus, the components may be distributed over a network on different platforms in a distributed environment, and/or configured in a cloud computing environment. Further, the computer systems of the present disclosure may include multiple processors and/or cores.

Each server shown in FIG. 3, e.g., the source server 320, the migration server 322, and the target server 324 may have CPU, memory, data network interface, and other components. While some components move in migration, FIG. 3 shows the start state of the migration in one embodiment of the present disclosure. Initially, configuration files reside on one or more source servers 320, for example, as electronic files on disk or other storage medium.

In one aspect, the migration server 322 may include the functional components of the present disclosure. The discovery module 302 may fetch the configuration files (or parts of the configuration files), and/or information about the configuration files, and/or others onto the migration server 322. The discovery module 302 identifies dependencies existing in one or more components, for instance, by analyzing various configuration files and/or information.

If the source server 320 is part of the wave to be migrated, its components will be moved to the target server 324. The target server 324 may be different physical server from the source server 320. But, it also may be possible that in consolidation or physical-to-virtual systems, the target server 324 may be the same server as the source server 320. After migration, there may be configuration files and run-time data and/or logs on the target server 324, copied from the source server 320 with relinking and other changes performed.

If the source server 320 is not part of the wave, but has dependencies on another source server in the wave, then its configuration files are changed where they are. In another aspect, even if the source server 320 is not part of the wave, its configuration files may have been copied or fetched to the migration server 322. In that case, the configuration files may be changed at the migration server 322 and copied back from the migration server to the source server 320.

A planning module 310 may plan or formulate placement of the components and group the components into waves in which they are to be moved. Based on the outputs of the discovery module 302 and the planning module 310, a relink module 312 determines relinking needs, for example, determines which components need to be modified. The relink module 312 may also implement the modifications in the components. It should be understood that the modules disclosed herein describe functional aspects. Thus, one physical module may perform all the functions of discovering and relinking, and planning and placement, or a number of different modules or sub-modules may perform different functions separately, and the present disclosure is not limited to one particular implementation.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages, a scripting language such as Perl, VBS or similar languages, and/or functional languages such as Lisp and ML and logic-oriented languages such as Prolog. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). Parts of the program code may execute on the source and target servers of the migration.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 6:
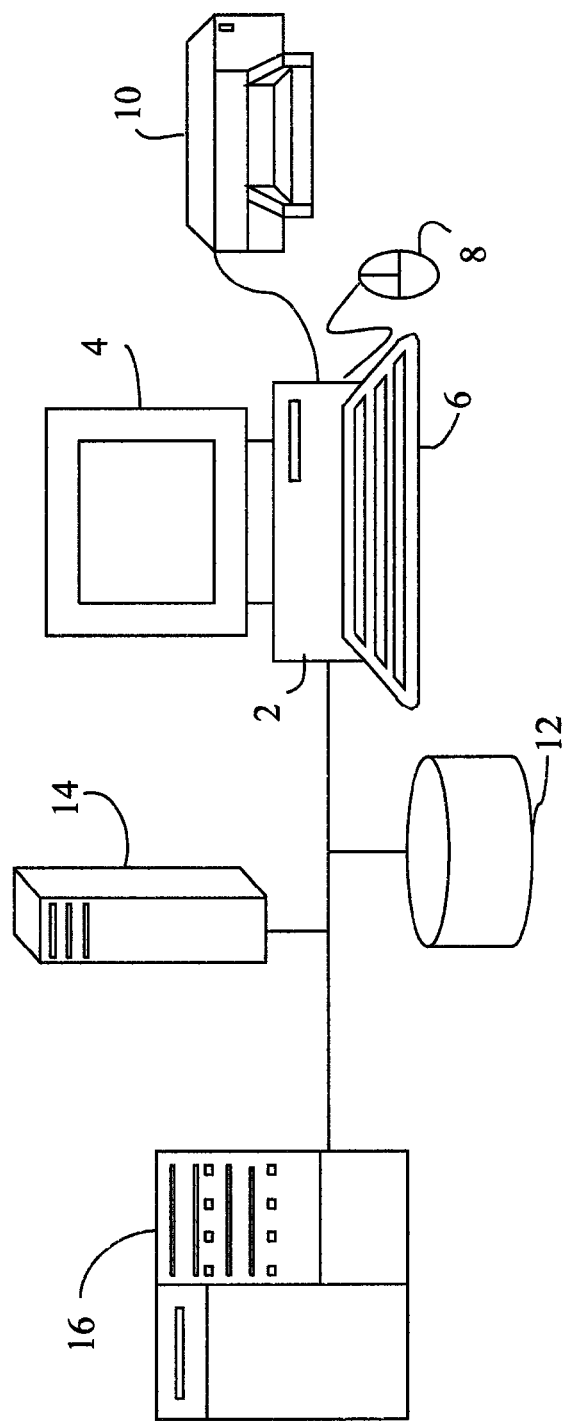
FIG. 6 illustrates an example of a computer system, in which the systems and methodologies of the present disclosure may be carried out or executed.

Referring now to FIG. 6, the systems and methodologies of the present disclosure may be carried out or executed in a computer system that includes a processing unit 2, which houses one or more processors and/or cores, memory and other systems components (not shown expressly in the drawing) that implement a computer processing system, or computer that may execute a computer program product. The computer program product may comprise media, for example a hard disk, a compact storage medium such as a compact disc, or other storage devices, which may be read by the processing unit 2 by any techniques known or will be known to the skilled artisan for providing the computer program product to the processing system for execution.

The computer program product may comprise all the respective features enabling the implementation of the methodology described herein, and which—when loaded in a computer system—is able to carry out the methods. Computer program, software program, program, or software, in the present context means any expression, in any language, code or notation, of a set of instructions intended to cause a system having an information processing capability to perform a particular function either directly or after either or both of the following: (a) conversion to another language, code or notation; and/or (b) reproduction in a different material form.

The computer processing system that carries out the system and method of the present disclosure may also include a display device such as a monitor or display screen 4 for presenting output displays and providing a display through which the user may input data and interact with the processing system, for instance, in cooperation with input devices such as the keyboard 6 and mouse device 8 or pointing device. The computer processing system may be also connected or coupled to one or more peripheral devices such as the printer 10, scanner (not shown), speaker, and any other devices, directly or via remote connections. The computer processing system may be connected or coupled to one or more other processing systems such as a server 10, other remote computer processing system 14, network storage devices 12, via any one or more of a local Ethernet, WAN connection, Internet, etc. or via any other networking methodologies that connect different computing systems and allow them to communicate with one another. The various functionalities and modules of the systems and methods of the present disclosure may be implemented or carried out distributedly on different processing systems (e.g., 2, 14, 16), or on any single platform, for instance, accessing data stored locally or distributedly on the network.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Various aspects of the present disclosure may be embodied as a program, software, or computer instructions embodied in a computer or machine usable or readable medium, which causes the computer or machine to perform the steps of the method when executed on the computer, processor, and/or machine. A program storage device readable by a machine, tangibly embodying a program of instructions executable by the machine to perform various functionalities and methods described in the present disclosure is also provided.

The system and method of the present disclosure may be implemented and run on a general-purpose computer or special-purpose computer system. The computer system may be any type of known or will be known systems and may typically include a processor, memory device, a storage device, input/output devices, internal buses, and/or a communications interface for communicating with other computer systems in conjunction with communication hardware and software, etc.

The terms "computer system" and "computer network" as may be used in the present application may include a variety of combinations of fixed and/or portable computer hardware, software, peripherals, and storage devices. The computer system may include a plurality of individual components that are networked or otherwise linked to perform collaboratively, or may include one or more stand-alone components. The hardware and software components of the computer system of the present application may include and may be included within fixed and portable devices such as desktop, laptop, server. A module may be a component of a device, software, program, or system that implements some "functionality", which can be embodied as software, hardware, firmware, electronic circuitry, or etc.

The embodiments described above are illustrative examples and it should not be construed that the present invention is limited to these particular embodiments. Thus, various changes and modifications may be effected by one skilled in the art without departing from the spirit or scope of the invention as defined in the appended claims.

We claim:

1. A method for component relinking in migrations, comprising:

discovering, using one or more processors, one or more dependencies in one or more components;

discovering the one or more dependencies further comprising discovering at least one or more dependencies of one or more non-migrating components in said one or more components;

planning one or more new locations where the one or more components are to be placed;

determining relinking needs in the one or more components and the one or more non-migrating components based on the discovering and the planning; and applying the relinking needs, comprising making changes to at least the one or more non-migrating components that depend on the one or more components migrating to said one or more new locations, wherein the discovering one or more dependencies in one or more components includes observing run-time interchanges between the one or more components, the run-time interchanges including at least an address element from which said one or more dependencies can be discovered.

2. The method of claim 1, wherein the discovering, planning, determining, and applying steps are performed automatically.

3. The method of claim 1, wherein the applying is performed manually based on automatically generated output from the discovering, planning and determining steps.

4. The method of claim 1, wherein the planning further includes grouping the one or more components into a plurality of wave groups in which components in a wave group are to be moved together; and
the step of applying the relinking needs includes performing relinking in components that are not in a current wave group.

5. The method of claim 1, wherein the discovering one or more dependencies in one or more components includes performing static analysis of code or configuration files or combinations thereof, associated with the one or more components.

6. The method of claim 1, wherein the discovering one or more dependencies in one or more components further comprises discovering how the one or more dependencies are configured.

7. The method of claim 1, wherein said one or more dependencies in one or more components are at a different granularity than the planning of new locations.

8. The method of claim 1, wherein the step of applying the relinking needs includes an alias resolution.

9. The method of claim 1, wherein the step of applying the relinking needs includes making changes to one or more copies of code and configuration files associated with the one or more components.

10. The method of claim 1, wherein the discovering step outputs a list of pairs of source and target components of dependencies in form of a database, an XML file, a spreadsheet data file, a mathematical representation of a graph, or combinations thereof.

11. The method of claim 1, wherein the applying the relinking needs includes making changes directly into code and configuration files associated with the one or more components.

12. The method of claim 1, wherein the applying the relinking needs includes interacting with one or more components via associated management interfaces.

13. The method of claim 1, wherein the applying the relinking needs includes generating a predetermined set of configuration parameters to be used in installation associated with migrating the one or more components.

14. A computer readable storage memory storing a program of instructions executable by a machine to perform a method of component relinking in migrations, comprising:
discovering one or more dependencies among a plurality of components;
planning one or more new locations where at least one of the plurality of components is to be placed;
determining relinking needs in one or more of the plurality of components based on the discovering and the planning, including discovering changes needed to at least one non-migrating component of the plurality of components that depend on said at least one of the plurality of components to be placed in said one or more new locations; and
applying the relinking needs including at least making the changes to at least said one non-migrating component,
wherein the discovering one or more dependencies in one or more components includes observing run-time interchanges between the one or more components, the run-time interchanges including at least an address element from which said one or more dependencies can be discovered.

15. The computer readable storage memory of claim 14, wherein the discovering, planning, determining, and applying steps are performed automatically by one or more processors.

16. The computer readable storage memory of claim 14, wherein the applying is performed manually based on automatically generated output from the discovering, planning and determining steps.

17. The computer readable storage memory of claim 14, wherein said one or more dependencies among the plurality of components are at a different granularity than the planning of new locations.

18. The computer readable storage memory of claim 14, wherein the step of applying the relinking needs includes an alias resolution.

19. The computer readable storage memory of claim 14, wherein the step of applying the relinking needs includes making changes to one or more copies of code and configuration files associated with at least one of the plurality of components.

20. A system for component relinking in migrations, comprising:
a processor;
a discovery module operable to discover one or more dependencies in one or more components, the one or more dependencies including at least one or more dependencies of one or more non-migrating components in said one or more components;
a planning module operable to plan one or more new locations where the one or more components are to be placed; and
a relink module operable to determine relinking needs in the one or more components and the one or more non-migrating components based on output of the discovery module and the planning module and further operable to apply the relinking needs comprising making changes to at least the one or more non-migrating components that depend on the one or more components migrating to said one or more new locations,
wherein the discovery module is operable to observe run-time interchanges between the one or more components, the run-time interchanges including at least an address element from which said one or more dependencies can be discovered.

21. The system of claim 20, wherein the discovery module is operable to perform static analysis of code and configuration files associated with the one or more components and said one or more non-migrating components.

* * * * *